United States Patent [19]

Wang

[11] Patent Number: 5,236,583

[45] Date of Patent: Aug. 17, 1993

[54] HIGH-PRESSURE/VACUUM OPERATED APPARATUS FOR SEWAGE AND MUD DISPOSAL

[76] Inventor: Yiu-Te Wang, No. 65, Alley 1, Lane 230, Chung Cheng Road, Ta Lin Chen, Chiayi Hsien, Taiwan

[21] Appl. No.: 885,770

[22] Filed: May 20, 1992

[51] Int. Cl.⁵ .................. C02F 11/12; B30B 9/06
[52] U.S. Cl. .................. 210/181; 210/258; 210/299; 210/435; 210/460; 210/748; 204/157.42; 100/116
[58] Field of Search .............. 100/90, 116, 125, 126, 100/127, 131; 204/157.42; 210/181, 192, 205, 416.1, 224, 407, 435, 460, 496, 748, 202, 258, 299

[56] References Cited

U.S. PATENT DOCUMENTS

| | | | |
|---|---|---|---|
| 1,071,020 | 8/1913 | Bartholomew | 100/116 |
| 2,904,835 | 9/1959 | Thomas | 100/116 |
| 3,168,033 | 2/1965 | Hansen | 100/116 |
| 4,249,400 | 2/1981 | Arendt | 100/116 |
| 4,343,233 | 8/1982 | Burgin | 100/116 |
| 4,346,653 | 8/1982 | Rodak | 100/116 |
| 4,630,535 | 12/1986 | Haygreen | 100/116 |
| 4,646,633 | 3/1987 | Falquieres | 100/116 |
| 5,146,848 | 9/1992 | Dufour | 100/116 |

*Primary Examiner*—Peter Hruskoci
*Assistant Examiner*—Robert James Popovics
*Attorney, Agent, or Firm*—Bacon & Thomas

[57] ABSTRACT

A high pressure/vacuum operated apparatus for sewage and mud disposal includes a crossed duct having four terminals; and a movable tubular filter separably engaged with one terminal of the crossed duct with a flexible tube connected thereto; and an instant germicidal unit coupled to the flexible tube at one end and to a reservoir tank at the other which is associated with a vaccum pump and has an ultrasonic oscillator disposed therein for filtering heavy metal substance; and a reciprocally operated push stick which can detach the mud compressed into a solid block from the movable filter; a sewage discharge pipe connected to the upper terminal of the crossed duct via an inlet valve; one other terminal of the crossed duct being attached with a cylinder having a hydraulically operated piston reciprocally moved in the crossed duct, compressing the sewage mud against the movable tubular filter; a cleaning valve secured to the lower terminal; a filter plate made of high desity concrete or ceramics being secured to the tubular filter with a circular core member having a plurality of through holes disposed at the center thereof and communicating with a tube on the wall of which is disposed a peripheral flange so that the tube can be reciprocally actuated in a cylinder.

3 Claims, 4 Drawing Sheets

HIGH-PRESSURE/VACUUM OPERATED APPARATUS FOR SEWAGE AND MUD DISPOSAL

BACKGROUND OF THE INVENTION

The present invention relates to a high pressure/vacuum operated apparatus for sewage and mud disposal which is employed to process poisonous discharges from factories or hospitals.

Natural enviroment has been seriously polluted as a result of continual contamination by poisonous chemicals or metals in many heavily industrialized countries for the past decades. The pollution can easily jeopardize the health of the people living in the vicinity of the contaminated area by way of the air, the soil and water empoyed by those people, causing chronic dieases without much notice, this is particularly true in those underdeveloped countries.

To solve the above cited problems, there are a plurality of equipment developed to process the poisonous discharges. Those facilities can be classified into two kinds according to the operation method thereof, i.e., the sediment and chemistry type facilities are most popularly used. The sediment type apparatus is provided with a plurality of filter units through which discharged sewage is led separately so as to make the heavy metals and sewage mud to accumulate at the bottom of the apparatus via sediment with cleaned water flowing through the individual filter units. This kind of apparatus takes up too much space in the first place and is operated with unsatisfactory effect in the second place, and is not regarded as an efficient method of processing the sewage and sewage mud.

Another chemistry type apparatus is also used to process the poisonous sewage wherein the sewage is filled in containers first with proper chemicals added therein next; the processed sewage is then put aside for one or two days, permitting the chemicals to react with the heavy metals contained in the sewage and the sediments thereof will go to the bottom of the containers and the cleaned water is then removed from the containers. Although this method can produce a very good result, the length of operation time and the number of containers used make the method less competitive in the market.

SUMMARY OF THE INVENTION

The primary object of the present invention is to provide a high pressure/vacuum operated apparatus for sewage and mud disposal for processing the poisonous discharges from hospitals or industrious factories so that the sewage can be discharged into the natural enviroment without pollution.

One further object of the present invention is to provide a high pressure/vacuum operated apparatus for sewage and mud disposal which can compress the contaminated sewage and mud into solid blocks which are then recylced for further use or can be reprocessed as a construction material, or used as a filling material in a land producing project.

BRIEF DESCRIPTION OF THE DRAWINGS

To better illustrate the features, operation modes and the structure of the present invention for people skilled in the art, a number of drawings are given in company with a preferred embodiment thereof, in which.

DETAILED DESCRIPTION OF THE PREFERRED EMBODIMENT

Figure 1:
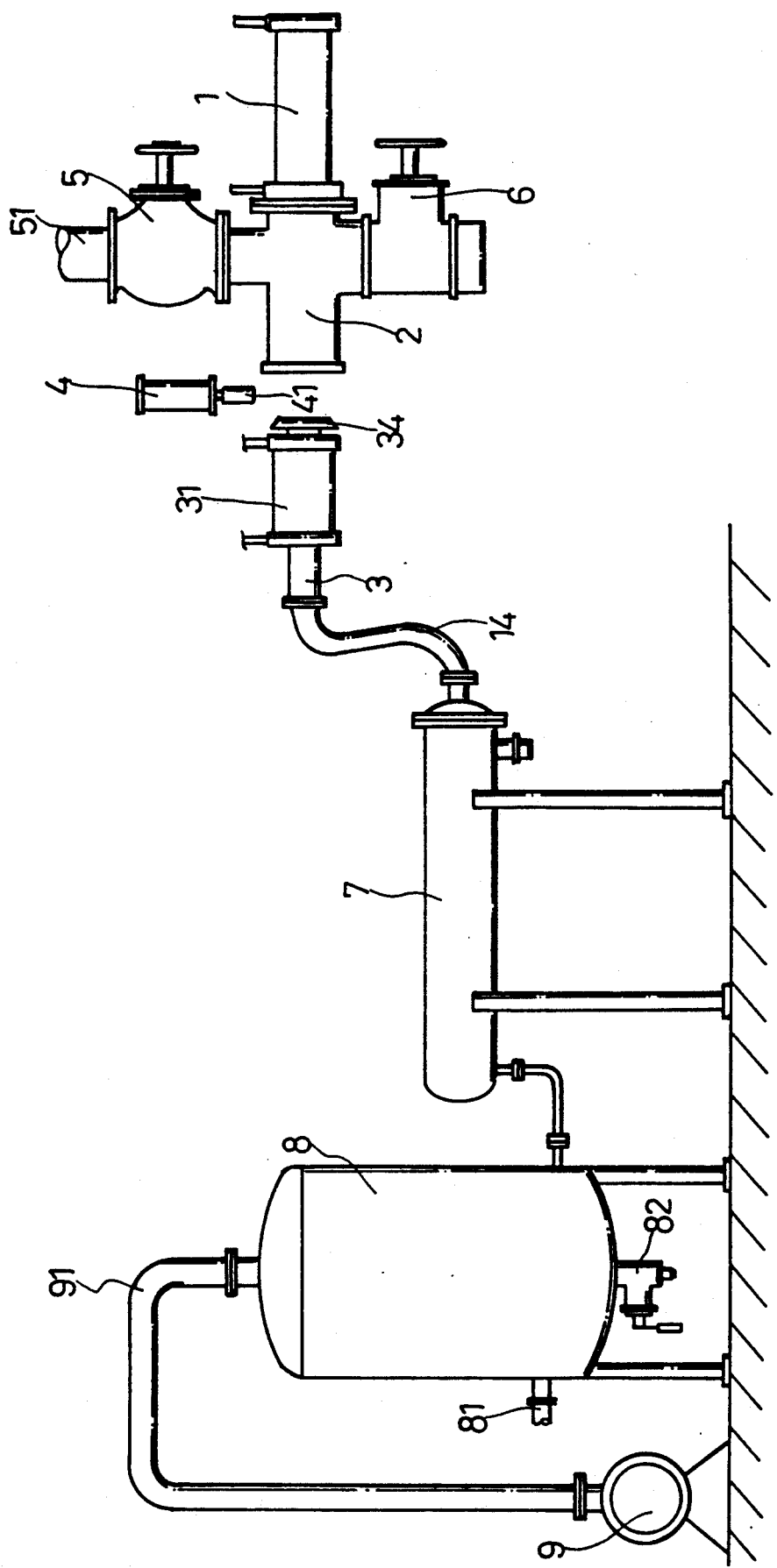
FIG. 1 is a diagram showing the overall structure of the present invention.
Figure 2:
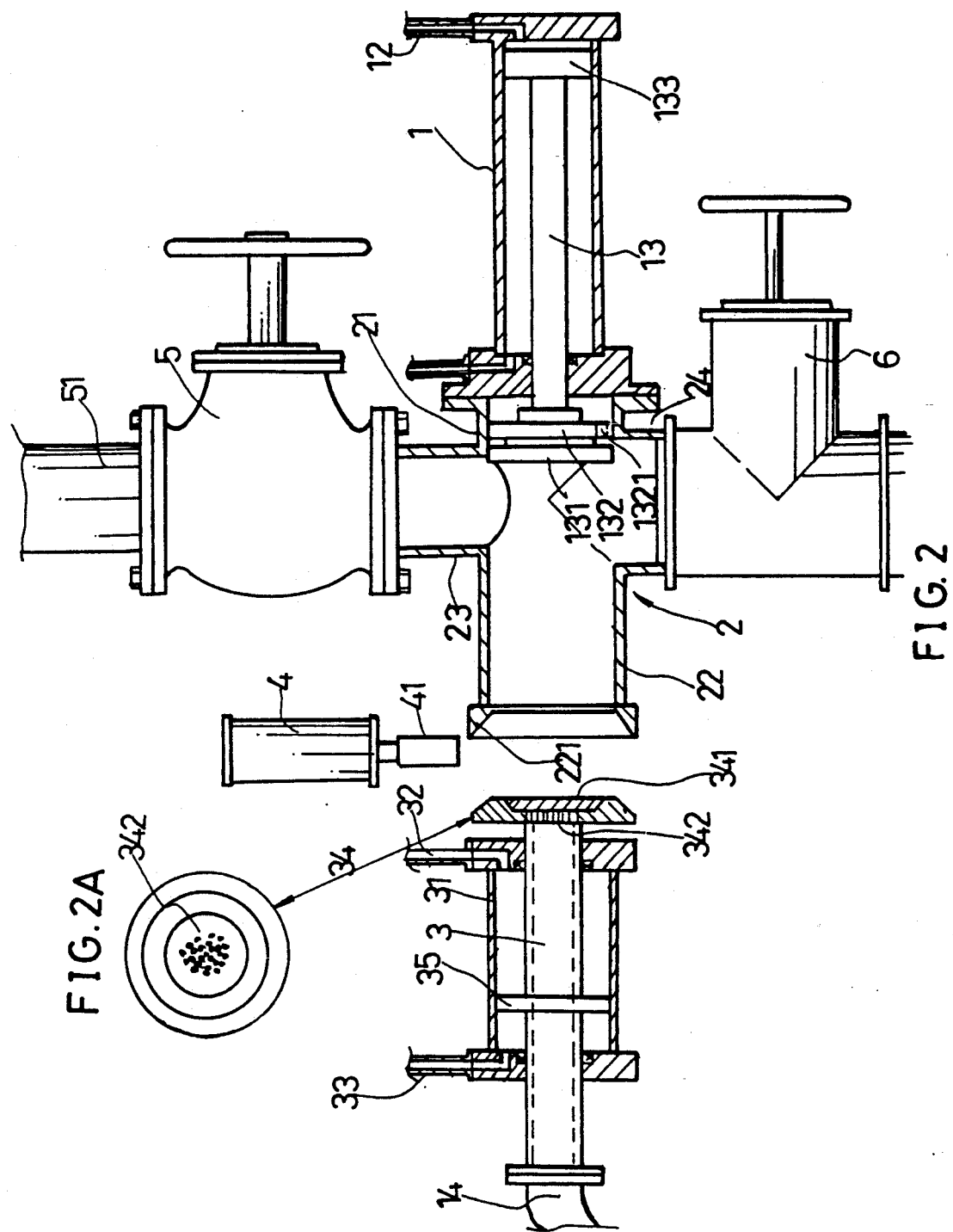
FIG. 2 is a partially sectioned diagram of the present invention.

Referring to FIGS. 1, 2, the present high pressure/vacuum operated apparatus for sewage and mud disposal comprises a sewage discharge pipe 51 coupled to an inlet valve 5; a crossed duct 2 having an upper terminal 23, a lower terminal 24, a front terminal 21 and a rear terminal 22., a cleaning valve 6 connected to the lower terminal 24; and a hydraulically operated cylinder 1 coupled to the front terminal 21 having a connecting rod 13 movably disposed therein which is provided with a first piston 133 at the right end thereof so as to permit the connecting rod 13 to be reciprocally actuated by fluid charged and discharged by way of the tubes 12; and a second piston 131 adjacent to a secondary piston 132 having a release hole 1321 disposed thereon that are secured to the left end of the connecting rod 13; a movable tubular filter 3 separably engaged with the rear terminal 22; and a flexible tube 14 secured to the tubular filter 3 at one end and to an instant germicidal unit 7; and a reservoir tank 8 connected to the instant germicidal unit 7 at one end and to a vacuum 9 at the other. The second piston 131 and the secondary piston 132 are disposed adjacent to each other at the opposite end of the piston 133 and are able to move between the front and the rear terminals 21,22 of the crossed duct 2 when the connecting rod 13 is actuated to move in either direction in the cylinder 1 as the first piston 133 is acted upon by the fluid charged into the cylinder 1 from either of the tubes 12 so that the connecting rod 13 can be reciprocally actuated. The terminating end of the rear terminal 22 is provided with a tapered periphery 221.

The movable tubular filter 3 is disposed in a cylinder 31 and is provided with a peripheral flange 35 on the outer wall thereof so that the tubular filter 3 is able to be actuated to reciprocally move inside the cylinder 31 as fluid is charged into either of the tubes 32, 33. The flexible tube 14 is coupled to one end of the tubular filter 3 so as to permit the same to extend forward and backward. The other end of the tubular filter 3 is provided with a tapered head 34 which is defined in conformity to the shape of the tapered periphery 221 of the rear terimal 22 of the crossed duct 2 so that the tubular filter 3 can be in sealing engagement with the rear terminal 22. A filter plate 341 made of high density concrete or ceramics is secured to the tapered head 34 and a circular core member 342 having a plurality of through holes disposed at the center thererof is placed behind the filter plate 341.

The other end of the flexible tube 14 is coupled to an instant germicidal unit 7 which is connected to a reservoir tank 8. An ultrasonic oscillator (not shown) is disposed in the reservoir tank 8 which is connected to a vacuum pump 9 by way of a communication duct 91 at the top thereof with a pair of release valves 81, 82 disposed at the bottom thereof.

A push stick 41 connected to a reciprocally operated piston assembly 4 is disposed between and above the separable crossed duct 2 and the movable tubular filter 3.

Figure 3:
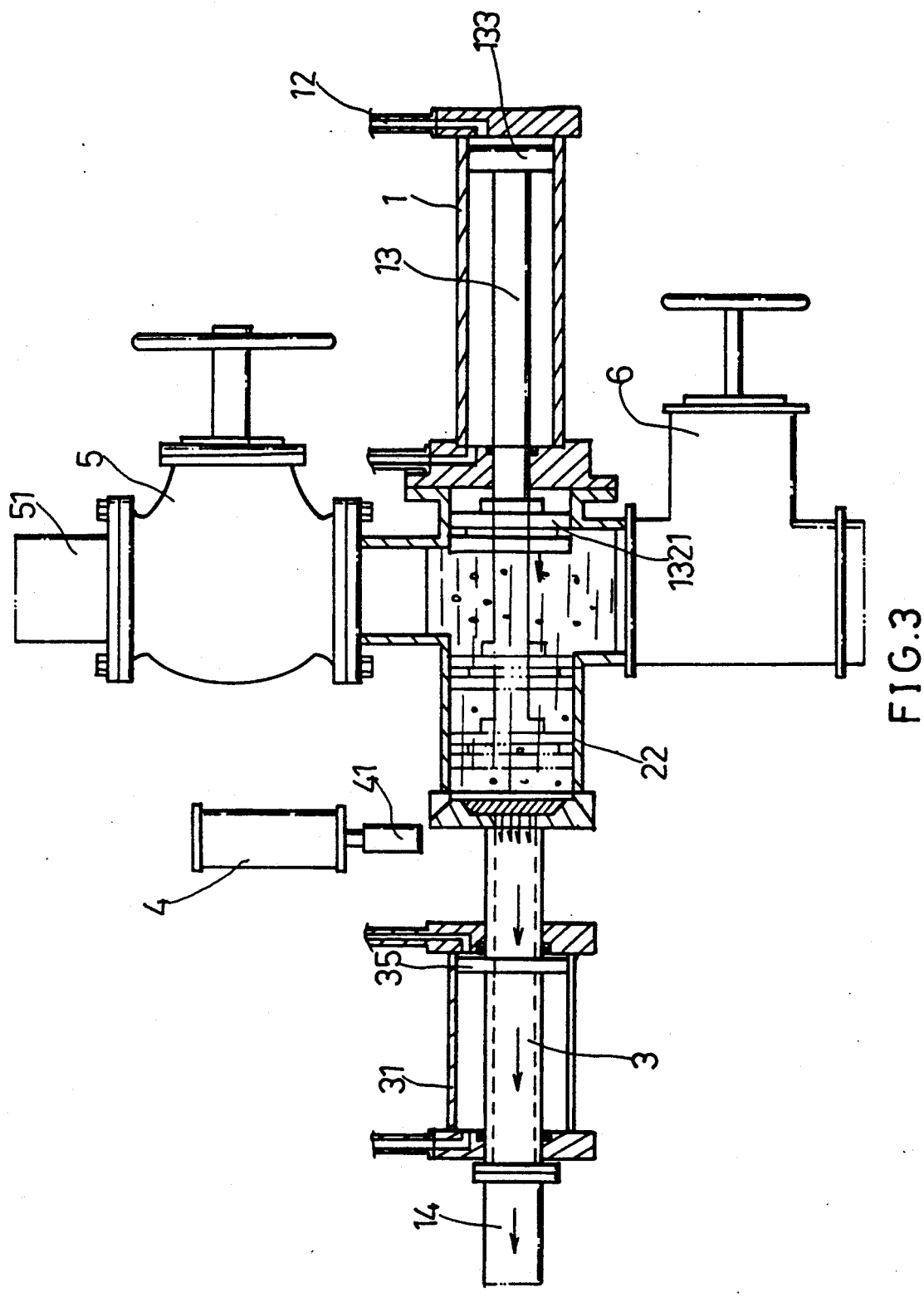
FIG. 3 is a partially sectioned diagram thereof showing the compression of the sewage mud in the present invention.
Figure 4:
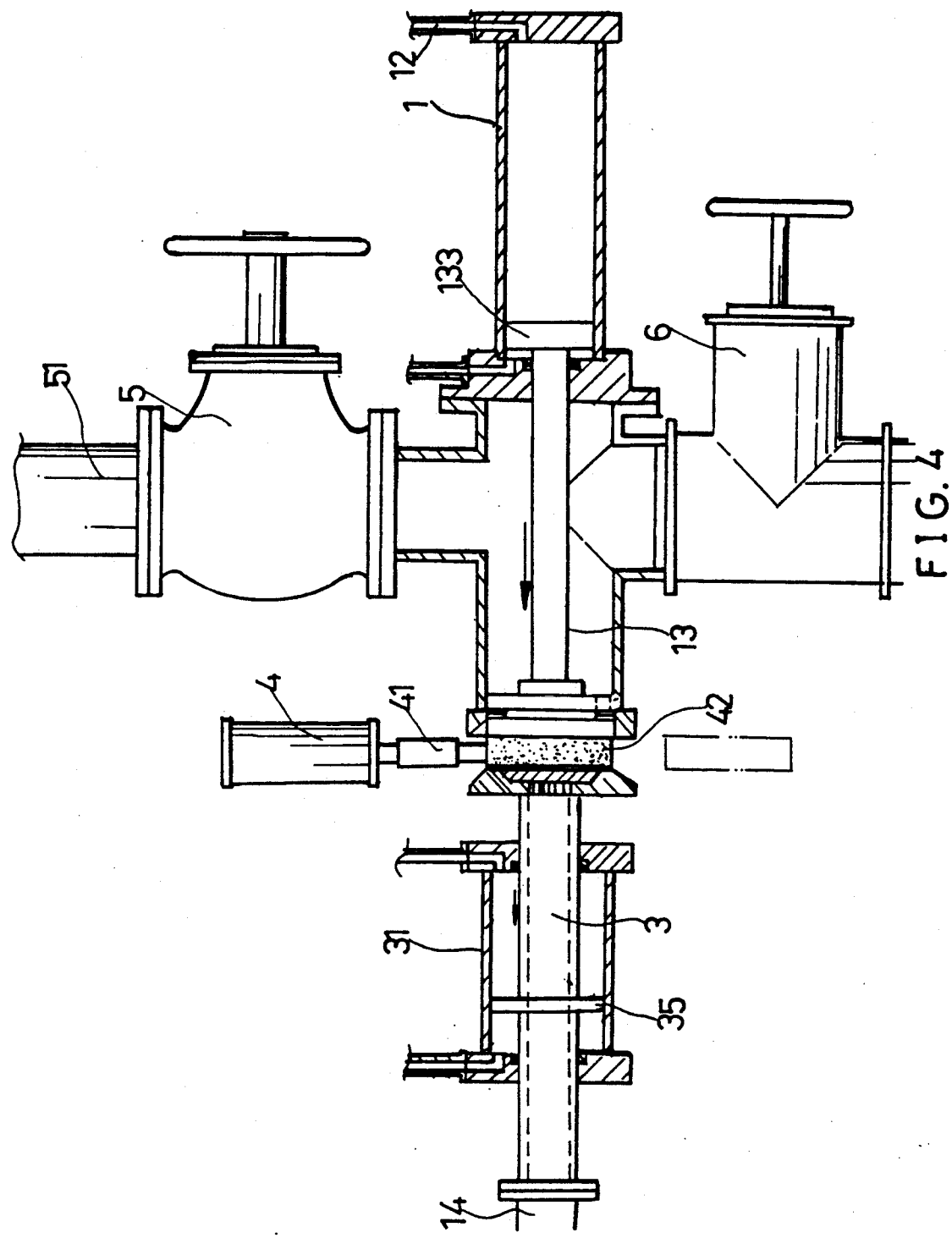
FIG. 4 is a partially sectioned diagram showing the removal of the compressed solid block from the movable tubular filter.

Referring to FIGS. 3, 4, the operation of the present invention is explained as below: Before the sewage is led via the sewage discharge pipe 51 and the inlet valve 5 into the crossed duct 2, the movable tubular filter 3 is actuated to extend toward the rear terminal 22 as a result of the peripheral flange 35 of the tubular filter 3 being acted upon by the fluid charge into the cylinder 31 via the tube 33, and the tapered head 34 being actuated to extend forward to sealedly engage with the tapered periphery 221 of the rear terminal 22. Afterwards, the sewage is infuted into the crossed duct 2, and the first piston 133 attached at the right end of the connecting rod 13 is forced upon by the fluid charged into the cylinder 1 via the tube 12 to move toward the rear terminal 22; and the piston 131 disposed at the other end of the connecting rod 13 is pushed against the sewage charged into the crossed duct 2 and make the sewage and mud compressed with the water contained in the sewage penetrating through the filter plate 341 and the circular core member 342 and further into the hollow tubular portion of the tubular filter 3 coupled to the flexible tube 14., the solid substance of the sewage is filtered and accumulated in front of the filter plate 341 of the tapered head 34 in a solid form indicated as 42; then the tapered head 34 is made to disengage from the tapered periphery 221 of the rear terminal 22 when the peripheral flange 35 is acted upon by the fluid charged into the cylinder 31 via the tube 32 to move in a reverse direction. Afterwards, the push stick 41 is actuated to push the solid block 42 separating from the filter plate 341. The solid block 42 is then collected and used as a construction material or as a filling material in a land producing project.

On the push stick 41 being made to move, the connecting rod 13 is simultaneously urged by the infuted fluid to resume its non-operating or original position; during the process, the sewage mud left in the front terminal 21 is compressed by the secondary piston 132, the release hole 1321 on the piston 132 permits the mud to escape therefrom so that the connecting rod 13 can be reciprocally actuated to perform the operation.

The filtered water penetrating the filter plate 341 is led, through the hollow tubular portion of the movable tubular filter 3 and the flexible tube 4, to the instant germicidal unit 7 in which heat is used to kill the bacteria contained in the filtered water. The water discharged from the unit 7 is further led to the reservoir tank 8 which is provided with an ultrasonic oscillator operating at the frequency: of the 3600 HZ thereby the heavy metal particles contained in the water is made to sink to the bottom of the reservoir tank 8. The sediment of the heavy metal particles can be collected by way of the release valve 82 and the purified water is then discharge from the release valve 81.

The vacuum pump 9 connected to the top of the reservoir tank 8 is so powerful that the speed of the penetration of the sewage water via the filter plate 341 can be effectively increased, and no blockage of the filter plate 341 can take place.

I claim:

1. A high pressure/vacuum operated apparatus for sewage and mud disposal, comprising:

a sewage discharge pipe connected to an inlet valve;

a crossed duct having a front terminal, a rear terminal, an upper terminal and a lower terminal; said upper terminal being connected to said inlet valve;

a cleaning valve connected to said lower terminal of said crossed duct;

a cylinder, having a connecting rod disposed therein which is provided with a first piston at the right end and a second piston adjacent to a secondary piston at the left end thereof, being coupled to said front terminal with said second piston and said secondary piston slidably disposed in both said front and rear terminals;

said connecting rod being able to be hydraulically actuated by a fluid infuted into the cylinder and acting upon said first piston disposed;

a movable tubular filter having a hollow tubular portion and a tapered head secured to one end thereof; and a filter plate and a circular core member having a plurality of through holes disposed at the center thereof being secured to said tapered head; and a peripheral flange being defined on the wall of said tubular filter;

said tubular filter being disposed in a cylinder which is provided with a tube at each end thereof via which fluid can be infuted so that said tubular filter can be reciprocally urged to move in said cylinder when said fluid exerting on either side of said peripheral flange;

a flexible tube connected to the end, opposite to said tapered head, of said tubular filter, and to an instant germicidal unit at the other end;

a reservoir tank connected to said instant germicidal unit at one end and to a vacuum pump at the other end, being provided with a pair of release valves at the bottom thereof;

a push stick connected to a reciprocally operated piston assembly being disposed between and above said crossed duct and said movable tubular filter;

2. A high pressure/vacuum operated apparatus for sewage and mud disposal as claimed in claim 1 wherein the terminating end of said rear terminal of said crossed duct is provided with a tapered periphery which is defined in correspondence to the shape of said tapered head so that said movable tubular filter can be sealedly engaged with said crossed duct when extended outward.

3. A high pressure/vacuum operated apparatus for sewage and mud disposal as claimed in claim 1 wherein said reservoir is provided with an ultrasonic oscillator which can make the heavy metal particles contained in the sewage sink to the bottom of the reservoir tank.

* * * * *